United States Patent
Altman et al.

[11] Patent Number: 5,827,352
[45] Date of Patent: Oct. 27, 1998

[54] METHOD FOR REMOVING MERCURY FROM A GAS STREAM AND APPARATUS FOR SAME

[75] Inventors: Ralph F. Altman, Chattanooga, Tenn.; Ramsay Chang, Los Altos, Calif.; Robert M. Henningsgaard, Clear Lake; Ronald W. Elsner, Coon Rapids, both of Tenn.

[73] Assignee: Electric Power Research Institute, Inc., Palo Alto, Calif.

[21] Appl. No.: 838,268

[22] Filed: Apr. 16, 1997

[51] Int. Cl.⁶ .................................................. B03C 3/014
[52] U.S. Cl. ......................... 95/58; 95/60; 95/66; 95/71; 95/234; 96/53; 96/74
[58] Field of Search .................................. 95/58, 60, 61, 95/71, 72, 234, 64–66; 96/27, 52, 53, 74

[56] References Cited

U.S. PATENT DOCUMENTS

| | | | |
|---|---|---|---|
| 1,413,993 | 4/1922 | Rhodes | 95/61 |
| 1,909,825 | 5/1933 | Hahn et al | 95/60 X |
| 4,006,066 | 2/1977 | Sparwald | 95/58 X |
| 4,208,383 | 6/1980 | Kisters et al. | 95/60 X |
| 4,305,909 | 12/1981 | Willett et al. | 95/66 X |
| 4,364,910 | 12/1982 | Willett et al. | 95/66 X |
| 4,889,698 | 12/1989 | Moller, et al. | 423/210 |
| 4,921,886 | 5/1990 | Ewan et al. | 423/235 |
| 5,270,015 | 12/1993 | Rochelle et al. | 96/55 X |
| 5,439,508 | 8/1995 | Mayer-Schwinning et al. | 95/58 |
| 5,505,766 | 4/1996 | Chang | 95/58 X |
| 5,591,412 | 1/1997 | Jones et al. | 96/27 X |
| 5,599,508 | 2/1997 | Martinelli et al. | 96/53 X |
| 5,624,476 | 4/1997 | Eyraud | 95/71 X |

OTHER PUBLICATIONS

Chang, R., et al., "Utility Flue Gas Mercury Control via Sorbent Injection," presented at the AWMA Specialty Conference on Emerging Solutions to VOC and Air Toxics Control, (Feb. 28–Mar. 1, 1996) Clearwater, Florida, 9 pages.

Casill, R.P., et al., "Air Toxic Control Technologies for Industrial Applications," Presented att 84th Annual Meeting of Air & Waste Management Association, (Jun. 16–21, 1991) Paper No. 91–103.8, Vancouver, British Columbia, pp. 1–37.

Carroll, et al., "Mercury Emissions from a Hazardous Waste Incinerator Equipped with a State–of–the–Art Wet Scrubber," (Sep. 1995) AMA Journal, vol. 45:730–736.

Riley, et al., "Removal of Heavy Metals and Dioxin in Flue Gas Cleaning After Waste Incineration," (Jun. 16–21, 1991) Presented at 84th Annual Meeting of Air & Waste Management Association, Paper No. 91–35.9, Vancouver, British Columbia, pp. 1–16.

*Primary Examiner*—Richard L. Chiesa
*Attorney, Agent, or Firm*—Flehr Hohbach Test Albritton & Herbert LLP

[57] ABSTRACT

A method for removing mercury from a gas stream. In the method, sorbent is injected into the gas stream. Water is dispersed into the gas stream to create a cooled gas stream. The cooled gas stream is allowed to dwell with the sorbent in a chamber to remove mercury from the cooled gas stream. The cooled gas stream is passed through an electrostatic precipitator located above the chamber which collects water and recycles the collected water back into the chamber for cooling the gas stream in the chamber. An apparatus for removing mercury from a gas stream is also provided.

21 Claims, 1 Drawing Sheet

METHOD FOR REMOVING MERCURY FROM A GAS STREAM AND APPARATUS FOR SAME

BRIEF DESCRIPTION OF THE INVENTION

This invention relates to the removal of contaminants from a gas stream and more particularly to the removal of trace amounts of vapor phase contaminants such as mercury from the flue gas of a combustor.

BACKGROUND OF THE INVENTION

The emission of air toxics from combustion sources is an important issue in light of the 1990 Clean Air Act Amendments. Title III of these amendments governs air toxics. Air toxics are present in the flue gas of combustion sources and appear both as particulate metals such as nickel, arsenic and chromium in the fly ash particles and as vapor phase metals such as mercury, selenium and halides and organic vapors. Vapor phase air toxics are present in flue gas in trace concentrations of parts per million or less and are thus difficult to remove.

Several commercial techniques are currently used to remove mercury from gas streams. The sorbents utilized are most commonly activated carbons or carbons treated chemically to produce sulfide or iodide compounds with mercury. In one approach used primarily on waste incinerators, frequently aimed at acid gases and dioxins/furans, sorbents are injected into a gas stream before a particulate collection device. In another approach also used mainly in waste incinerators, vapor phase air toxics such as mercury are removed when the gas stream is passed through a packed bed of sorbent. The few applications of these systems were also installed to remove $SO_2$ and $NO_x$. Mercury removal is a side benefit in these systems, and activated carbon is typically used for collecting the mercury. These systems, however, are not without their limitations. Packed beds, for example, are complex to design and operate. In addition, they produce high pressure drops and require periodic regeneration.

Recent work on removal of mercury from flue-gas streams has involved the use of injected adsorbents and wet chemicals. See, for example, Riley, J., R. Knoche and J. Vicinus; "Removal of Heavy Metals and Dioxin in Flue Gas Cleaning After Waste Incineration" presented at the 84th Annual Meeting of the Air & Waste Management Association, Paper No. 91-35.9, in Vancouver, British Columbia, Jun. 16–21, 1996. Wet systems involve equipment such as scrubber towers, spray dryers, wet electrostatic precipitators or water-treatment facilities. Riley et al. describes processes used in Europe to remove metals, specifically mercury, from municipal solid waste (MSW) combustor flue-gas. In one system, flue gas is contacted initially with water to reduce gas temperatures. A wet ESP is then used to remove residual aerosols and particles from the gas stream. The liquid effluent from the process is treated at a central wastewater-treatment facility. Another facility uses a treatment system comprised of a spray dryer, a baghouse, a scrubber tower, and a wet ESP, all connected in series. Tests were performed using flue-gas additives to enhance mercury removal on several systems that had a single scrubbing stage. Prior to the addition of additives, the facilities had a removal efficiency of approximately 60%. The additives improved removals to 80% to 90%. One form of an additive was a "sulfidic complex" added to water sprayed into the flue gas. Another additive was powdered activated lignite coke or activated carbon. The carbonaceous materials were added to hydrated lime and injected in the spray dryer. Riley et al. also reports on a duct-injection test of activated lignite coke. The activated material was co-injected into flue gas with hydrated lime or limestone. A baghouse was used downstream to capture the solid materials. Mercury and dioxin were removed effectively from the flue gas at temperatures of 100° C. to 120° C. See also Carroll, G., R. Thurnau and D. Fournier, Jr.; "Mercury Emissions for a Hazardous Waste Incinerator Equipped with a State-of-the-Art Wet Scrubber", AWMA Journal, Volume 45: 730–736, September, 1995. Carroll et al. describes a collision scrubber followed by an entrainment separator and wet ESP for acid gas and particulate control.

Another commercial control device is discussed in Casill, R. P. and J. Laznow; "Air Toxic Control Technologies for Industrial Applications" presented at the 84th Annual Meeting of the Air & Waste Management Association, Paper No. 91-103.8, in Vancouver, British Columbia, Jun. 16–21, 1996. Casill et al. discloses a system composed of a quench reactor followed by a dry venturi and baghouse. It is reported that mercury can be removed using the system to efficiencies of 90% when an "appropriate absorbent" is used.

In a recent pilot plant study, sorbents such as activated carbon were injected directly into a gas stream to absorb trace amounts of vapor mercury. Specifically, activated carbon was injected into the ductwork after the air heater of a coal-fired boiler where it was collected in a downstream particulate collector such as an electrostatic precipitator (ESP) or a baghouse used to collect fly ash from the coal combustion.

Chang (U.S. Pat. No. 5,505,766) discloses a method for removing vapor phase air toxics from a combustor flue gas in which the flue gas is passed through a baghouse having a filter bag coated with a layer of a predetermined amount of sorbent. The sorbent layer provides a high ratio of sorbent to vapor phase air toxics on the filter bag for facilitating intimate contact between the sorbent and the vapor phase air toxics and thus enhancing the sorbing of vapor phase air toxics from the flue gas.

Moller (U.S. Pat. No. 4,889,698) discloses removing mercury vapor and/or vapor of noxious organic compounds from flue gases by adding activated carbon to remove mercury by injecting the carbon into the flue gas before a baghouse in conjunction with a spray drying adsorption process for acid gas components such as sulfur oxides.

OBJECTS AND SUMMARY OF THE INVENTION

The primary object of the present invention is to provide an apparatus and method for removing pollutants such as vapor phase air toxics from a gas stream.

Another object of the invention is to provide an apparatus and method of the above character for removing mercury from flue gas of a combustor.

Another object of the invention is to provide an apparatus and method of the above character which captures other air pollutants such as particulates, $SO_x$ and HCL so that the overall cost of air pollution control can be reduced.

Another object of the invention is to provide an apparatus and method of the above character which reduces the temperature of the gas stream to permit effective pollutant removal.

Another object of the invention is to provide an apparatus and method of the above character which adds water to the gas stream to reduce the temperature thereof.

Another object of the invention is to provide an apparatus and method of the above character which permits the cooled gas stream to dwell in a chamber for enhancing pollutant removal.

Another object of the invention is to provide an apparatus and method of the above character which adds water to the gas stream with a wet electrostatic precipitator located atop the chamber.

These and other objects are achieved by providing a method for removing mercury from a gas stream. In the method, sorbent is injected into the gas stream. Water is dispersed into the gas stream to create a cooled gas stream. The cooled gas stream is allowed to dwell with the sorbent in a chamber to remove mercury from the cooled gas stream. The cooled gas stream is passed through an electrostatic precipitator located above the chamber which collects water and recycle the collected water back into the chamber for cooling the gas stream in the chamber. An apparatus for removing mercury from a gas stream is also provided.

Additional objects and features of the invention will appear from the following description from which the preferred embodiments are set forth in detail in conjunction with the accompanying drawings.

DETAILED DESCRIPTION OF THE INVENTION

Reference will now be made in detail to the preferred embodiment of the invention which is illustrated in the accompanying figures. The description of the embodiment of the invention will be followed by a discussion of its operation.

Figure 1:
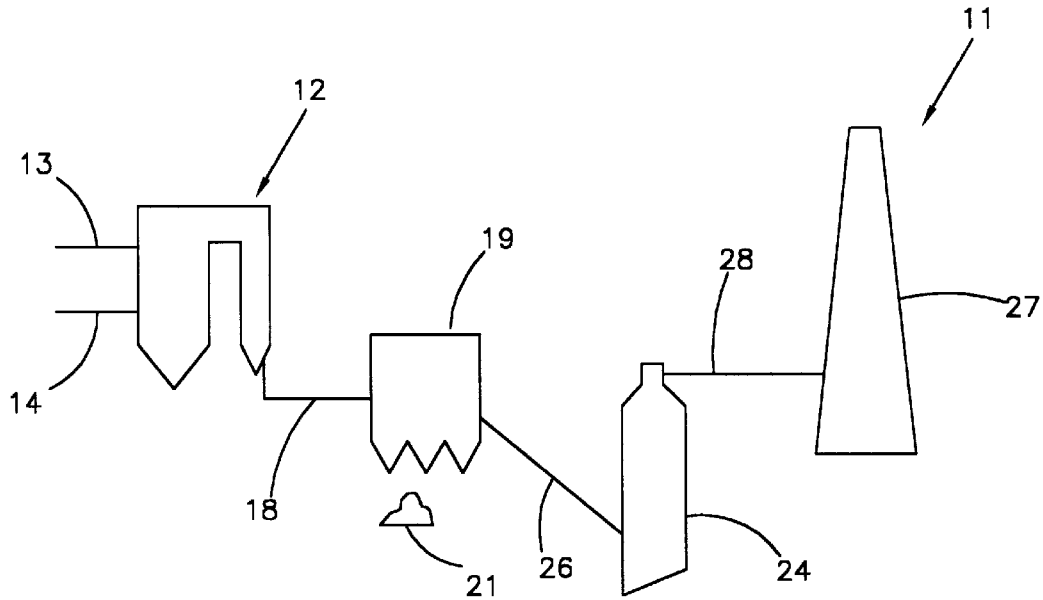
FIG. 1 is a schematic view of a system for removing pollutants from combustor flue gas incorporating the apparatus and method of the present invention.

Pollutant removal system 11 of the present invention is for use with a combustion source such as a fossil-fuel-fired boiler 12 which receives air through air inlet duct 13 to combust fuel such as coal received through fuel inlet duct 14 (see FIG. 1). The combustion process within boiler 12 produces a gas stream in the form of flue gas which exits the boiler through outlet duct 18. The flue gas produced within the boiler is comprised of air, products of combustion in the gaseous form such as water vapor, carbon dioxide, oxides of nitrogen and sulfur, halides, organic compounds, mercury, selenium and other trace metal vapors and particulate matter.

System 11 includes a primary particulate control device or collector such as electrostatic precipitator or ESP 19 which is coupled to boiler 12 via outlet duct 18. ESP 19 serves to, among other things, remove particulate matter such as fly ash particles 21 from the flue gas. These particles 21 are discharged from the ESP as shown in FIG. 1. It should be appreciated, however, that the primary particulate collector could be a baghouse or comprise one of more electrostatic precipitators or baghouses and be within the scope of the present invention. System 11 further includes a high efficiency multipollutant control tower 24 coupled to ESP 19 by an inlet duct 26 and to a silo 27 located downstream of the tower 24 by means of an outlet duct 28.

Figure 2:
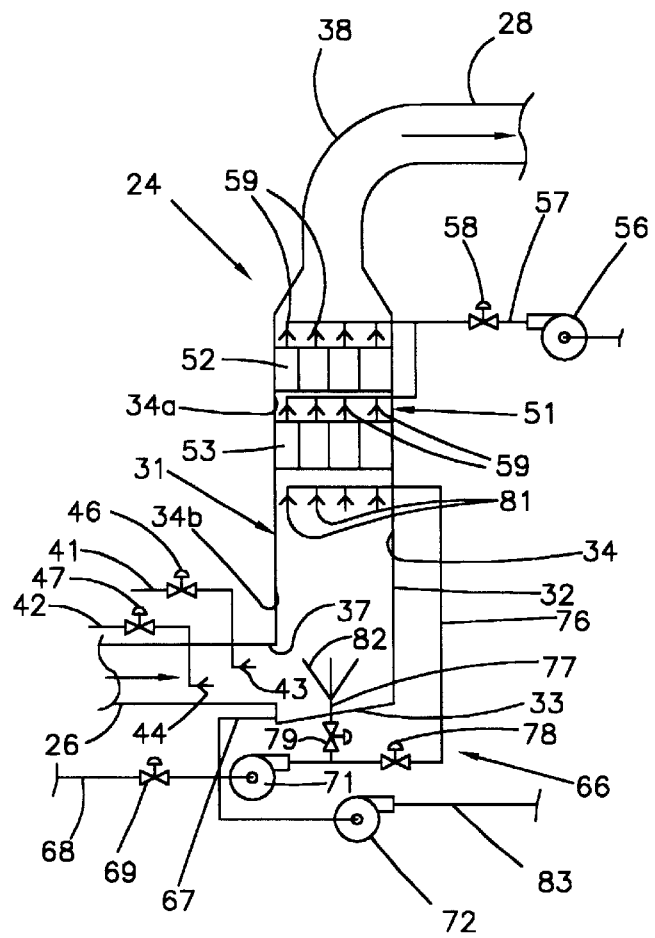
FIG. 2 is a schematic side elevational view of the apparatus for removing mercury from a gas stream shown in the system of FIG. 1.

Tower 24, as shown in FIG. 2, consists of a vessel 31 having a side wall 32 and a bottom wall 33 for forming an internal chamber 34 having upper and lower portions 34a and 34b. Vessel 31 has an inlet 37 provided in side wall 32 for joining inlet duct 26 to the vessel and permitting the duct 26 to communicate with lower portion 34b of chamber 34. The upper portion of vessel 31 funnels into an elbow 38 which is joined to outlet duct 28. The gas stream from ESP 19 thus enters internal chamber 34 through inlet 37 and travels upwardly through the chamber before exiting through outlet duct 28.

Means is provided for injecting first and second sorbents into the gas stream traveling through vessel 31. This means include first and second lines 41 and 42 connected to first and second injectors or nozzles 43 and 44 disposed within inlet duct 26 in the vicinity of inlet 37. First and second control valves 46 and 47 are provided on first and second line 41 and 42.

At least one particulate control device or collector is included within tower 24. Specifically, a wet electrostatic precipitator 51 is provided in upper portion 34a of internal chamber 34. Wet ESP 51 has a first or upper field 52 located above a second or lower field 53. Alternatively, a wet ESP having a single field or greater than two fields can be provided. The number of fields in the wet ESP is proportionally related to the loading or concentration of the sorbent in the gas stream and the size distribution of sorbent and other particles in the gas stream. A water supply is provided for wetting each of the fields 52 and 53 and includes a pump 56 coupled at its outlet to a line 57 having a control valve 58 thereon. Line 57 bifurcates after valve 58 to feed a plurality of nozzles 59 for each of fields 52 and 53. Alternatively, a single nozzle 59 can be provided for each of fields 52 and 53.

Tower 24 further includes a recirculator 66 which serves as a recirculation loop for recycling the water, sorbent, fly ash slurry from the bottom of internal chamber 34. Bottom wall 33 of vessel 31 is sloped to direct material collected thereon to drain line 67 coupled to vessel 31. Drain line 67 is coupled to a secondary water inlet line 68 having a control valve 69 thereon. Inlet line 68 entrains the material in drain line 67 and directs it to one of first and second drain pumps 71 and 72. The first drain pump 71 has an outlet coupled to first or upper recirculation line 76 and second or lower recirculation line 77 having respective control valves 78 and 79 thereon. Upper recirculation line 76 is connected to at least one and as shown a plurality of nozzles 81 disposed below wet ESP 51 for directing material carried thereby downwardly into chamber 34. Lower recirculation line 77 is connected to at least one nozzle 82 for directing material therein upwardly into lower portion 34b of chamber 34. Drain line 67, pump 71, lines 76 and 77 and nozzles 81 and 82 are included with recirculator 66. Second pump 72 has an outlet coupled to tower drain line 83.

In operation and use, a gas stream in the form of flue gas is directed from boiler 12 to ESP 19 by means of outlet duct 18 and then to tower 24 via inlet duct 26. As shown in FIG. 2, the flue gas enters lower portion 34b of vessel 31 by means of inlet 37. A mercury sorbent such as activated carbon is injected into the flue gas. The activated carbon can be injected into chamber 34 or, as shown, into duct 26 upstream of chamber 34 by means of first line 41 and first nozzle 43.

Water or a water/sorbent mixture is dispersed or sprayed into chamber 34 by means of nozzles 59, 81 and 82 to lower the temperature of the flue gas within the chamber to a temperature ranging from 100° F. To 275° F. and preferably less than 250° F. The adsorption capacity of activated carbon and other sorbents increases with lower temperature. Thus, the low temperatures produced within lower portion 34b of chamber 34 ensure that there is sufficient activated carbon mercury adsorption capacity at reasonable adsorption injection rates. In this manner, optimal mercury sorption is achieved within vessel 31.

Vessel 31 and chamber 34 therein are designed to produce a flue gas residence time ranging from 1 to 20 seconds and preferably from 5 to 10 seconds to allow a large portion of the mercury in the flue gas to be removed by the injected sorbent. The size of chamber 34 relative to the flow rate of flue gas passing therethrough can be adjusted to determine the precise residence time. Specifically, as can be appreciated by those skilled in the art, the velocity of the flue gas through chamber 34 is inversely related to the cross-sectional area of the chamber and the travel time of the flue gas through the chamber is proportional to the height of the chamber.

The flue gas rises from lower portion 34b into upper portion 34a and passes through fields 52 and 53 of wet ESP 51. The sorbent, liquid droplets from condensed vapor or unvaporized water and any remaining fly ash in the flue gas are collected by the wet ESP. Since wet ESP 51 is located directly atop chamber lower portion 34b, the excess water collected in the wet ESP falls directly back into the flue gas path where some of the water is revaporized into the gas stream to provide further cooling in chamber lower portion 34b. In addition, some of the sorbent is collected by wet ESP 51 and similarly rained down into chamber lower portion 34b for further mercury capture.

The water spray in chamber 34 and wet ESP 51 are controlled to optimize sorbent utilization and the operation of wet ESP 51. However, because wet ESP 51 collects water droplets from the flue gas passing therethrough and rains the collected water back down into chamber lower portion 34b, spray nozzles 81 and 82 do not have to produce a very fine mist to so optimize tower operation. Total evaporation of the water from nozzles 81 and 82 is not critical to the operation of tower 24 since any unevaporated water is collected and redisbursed by wet ESP 51.

The water, sorbent, fly ash slurry collected at the bottom of chamber 34 is partially recycled by recirculator 66 back into the chamber for cooling and further absorbent utilization. Specifically, this mixture is directed by drain line 67 and pump 71 back into the chamber through upper nozzles 81 facing downwardly into the chamber and lower nozzle 82 faced upwardly from the bottom of the chamber. Part of the mixture is removed from tower 24 by means of second pump 72 and tower drain 83.

The processing within tower 24 is also suitable for the removal of $SO_x$ and HCL present in the flue gas. In this regard, an additional sorbent such as hydrated lime is injected into the flue gas upstream of chamber 34 by means of second line 42 and second nozzle 44. Alternatively, the hydrated line can be injected with the mercury sorbents through line 41 and nozzle 43 and be within the scope of the present invention. The low temperature and the moisture present within vessel 31 is ideal for the effective removal of $SO_x$ and HCL. Wet ESP 51 further serves to capture the additional sorbent particles for recycling through recirculator 66 or disposal.

The process of tower 24 can be operated so that the flue gas exiting wet ESP 51 has a temperature above the moisture saturation dew point, preferably a temperature ranging from 20° F. to 50° F. above the moisture saturation dew point, to enhance plume buoyancy and thus eliminate the need for a wet stack. As can be appreciated by those skilled in the art, variables which affect the moisture content of the flue gas exiting tower 24 include the amount of flue gas traveling through the tower and the amount of water injected or otherwise introduced into chamber 34 for a given period of time. Alternatively, a wet stack can be utilized in system 11 if needed for a saturated flue gas.

Although the method and apparatus of the present invention have been described for use in removing mercury from a gas stream, it should be appreciated that tower 24 is also useful for removing organic vapors such as benzene from a flue gas. Furthermore, although the process and apparatus of the present invention have been described for use with a boiler 24, tower 24 can be used with any combustion facility that burns a mercury containing fuel or feedstock and already has a moderate to high efficiency particulate collection device. Such a facility includes metallurgical processes, municipal waste incinerators, cement kilns and hazardous waste incinerators as well as the coal-fired boiler discussed above.

From the foregoing, it can be seen that an apparatus and method for removing pollutants such as vapor phase air toxics from a gas stream has been provided. The apparatus and method are particularly suited for removing mercury from flue gas of a combustor. Other air pollutants such as particulates, $SO_x$ and HCL are also captured so that the overall cost of air pollution control can be reduced. In the apparatus and method, the temperature of the gas stream is reduced to permit effective pollutant removal. The cooled gas stream dwells in a chamber for enhancing pollutant removal. A wet electrostatic precipitator is located atop the chamber for watering the gas stream.

What is claimed is:

1. A method for removing mercury from a gas stream comprising the steps of injecting sorbent into the gas stream, dispersing water into the gas stream to create a cooled gas stream, allowing the cooled gas stream to dwell with the sorbent in a chamber for removing mercury from the cooled gas stream and passing the cooled gas stream through an electrostatic precipitator located above the chamber to collect water and recycle the collected water back into the chamber for cooling the gas stream in the chamber.

2. The method of claim 1 wherein the sorbent is activated carbon.

3. The method of claim 1 wherein the dispersing step includes the step of cooling the chamber to a temperature ranging from 100° F. to 275° F.

4. The method of claim 3 wherein the dispersing step includes the step of cooling the chamber to a temperature less than 250° F.

5. The method of claim 1 further comprising the step of collecting water from the bottom of the chamber and recycling the collected water back into the chamber.

6. The method of claim 5 further comprising the step of collecting sorbent from the bottom of the chamber and recycling the collected sorbent back into the chamber.

7. The method of claim 1 further comprising the step of injecting an additional sorbent into the gas stream for removing additional vapor phase contaminants from the gas stream.

8. The method of claim 7 wherein the additional vapor phase contaminants include $SO_x$ and HCL.

9. The method of claim 8 wherein the additional sorbent is hydrated lime.

10. The method of claim 1 further comprising the step of operating the chamber so that the gas stream exiting the electrostatic precipitator has a temperature above the moisture saturation dew point.

11. The method of claim 10 wherein the gas stream exiting the electrostatic precipitator has a temperature ranging from 20° F. to 50° F. above the moisture saturation dew point.

12. A method for removing mercury from flue gas of a fossil fuel-fired boiler comprising the steps of injecting activated carbon into the flue gas, introducing the flue gas into a chamber, spraying water into the chamber to cool the flue gas and enhance mercury removal, passing the flue gas through a wet electrostatic precipitator located atop the chamber to collect sorbent and water from the flue gas and recycling the sorbent and water collected in the electrostatic precipitator back into the chamber.

13. The method of claim 12 further comprising the step of injecting hydrated lime into the flue gas to remove $SO_x$ and HCL from the flue gas.

14. The method of claim 13 further comprising the step of recycling water and sorbent collected from the bottom of the chamber back into the chamber.

15. An apparatus for removing contaminants from a gas stream comprising a vessel provided with an internal chamber, the vessel having an inlet in communication with the chamber for permitting a gas stream to be introduced into the chamber, an injector for injecting a sorbent into the gas stream to remove contaminants therein, at least one nozzle for dispersing water in the gas stream to enhance mercury removal and a wet electrostatic precipitator carried by the vessel above and in communication with the chamber for collecting water from the gas stream and raining the collected water back into the chamber for cooling the gas stream.

16. The apparatus of claim 15 wherein the chamber has upper and lower portions, the wet electrostatic precipitator being located in the upper portion of the chamber.

17. The apparatus of claim 16 wherein the at least one nozzle disperses water up into the lower portion of the chamber.

18. The apparatus of claim 16 further comprising a recirculator in communication with the lower portion of the chamber for recycling water drained from the lower portion of the chamber back into the chamber to cool the gas stream.

19. The apparatus of claim 15 further comprising a recirculator for recycling water and sorbent drained from the chamber back into the chamber for reuse.

20. The apparatus of claim 15 wherein the inlet includes a duct for receiving the gas stream from a fossil fuel-fired boiler, the injector being in communication with the duct for injecting the sorbent into the gas stream passing through the duct.

21. The apparatus of claim 20 further comprising an additional injector in communication with the duct for injecting hydrated lime into the gas stream to remove $SO_x$ and HCL therefrom.

\* \* \* \* \*